(12) United States Patent
Fan (10) Patent No.: US 12,231,881 B2
(45) Date of Patent: Feb. 18, 2025

(54) AUTHORIZATION CONFIGURATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/211,485

(22) Filed: Jun. 19, 2023

(65) Prior Publication Data

US 2023/0336988 A1    Oct. 19, 2023

Related U.S. Application Data

(63) Continuation of application No. PCT/CN2020/141832, filed on Dec. 30, 2020.

(51) Int. Cl.
  *H04W 12/06* (2021.01)
  *H04W 48/16* (2009.01)
  *H04W 84/04* (2009.01)

(52) U.S. Cl.
  CPC ........... *H04W 12/06* (2013.01); *H04W 48/16* (2013.01); *H04W 84/042* (2013.01)

(58) Field of Classification Search
  CPC ..... H04W 12/16; H04W 12/06; H04W 48/16; H04W 84/042; H04H 60/87; G08B 25/16; G06F 17/00
  See application file for complete search history.

(56) References Cited

U.S. PATENT DOCUMENTS

| | | | |
|---|---|---|---|
| 2019/0132709 A1* | 5/2019 | Graefe | ............ G08G 1/04 |
| 2020/0389835 A1 | 12/2020 | Talebi Fard et al. | |
| 2022/0174464 A1* | 6/2022 | Ohlsson | ............ H04W 76/50 |

FOREIGN PATENT DOCUMENTS

| | | |
|---|---|---|
| CN | 107070859 A | 8/2017 |
| CN | 108633000 A | 10/2018 |
| CN | 110831109 A | 2/2020 |
| CN | 110881183 A | 3/2020 |
| CN | 111213326 A | 5/2020 |
| CN | 111726808 A | 9/2020 |
| WO | 2018093948 A1 | 5/2018 |
| WO | 2020202078 A1 | 10/2020 |

OTHER PUBLICATIONS

Huawei et al., "Correction to 38.331 on SIB validity and emergency services for NPN", R2-2007842, 3GPP TSG-RAN WG2 #111e Online, Aug. 17-28, 2020.

(Continued)

*Primary Examiner* — Diane D Mizrahi
(74) *Attorney, Agent, or Firm* — BAYES PLLC (57) ABSTRACT

An authorization configuration method includes: a terminal device receives authorization configuration information, the authorization configuration information including emergency communication service authorization indication information associated with the identifier of at least one sub-network supported by a cell.

16 Claims, 3 Drawing Sheets

(56) References Cited

OTHER PUBLICATIONS

International Search Report issued in international application No. PCT/CN2020/141832, mailed Sep. 28, 2021.
Written Opinion of the International Searching Authority issued in international application No. PCT/CN2020/141832, mailed Sep. 28, 2021.
NEC, "K_ASME mismatch at IMS emergency call establishment", R2-100307, 3GPP TSG-RAN WG2 Meeting #68bis Valencia, Spain, Jan. 18-22, 2010.
Qualcomm Incorporated, "Report for email discussion [107#40][NR/NPN] SIB1 design", R2-1913633, 3GPP TSG-RAN WG2 Meeting #107bis Chongqing, China, Oct. 14-18, 2019.
ZTE Corporation et al., "Further Consideration on the System Information of the Private Network", R2-1912675, 3GPP TSG-RAN WG2 Meeting#107bis Chongqing, China, Oct. 14-18, 2019.
Ericsson, "Support of emergency calls in NPN-only cells", R2-2000132, 3GPP TSG-RAN WG2 #109 electronic Elbonia, Feb. 24-Mar. 6, 2020.
3GPP TS 38.331 V16.2.0 (Sep. 2020); Technical Specification Group Radio Access Network; NR; Radio Resource Control (RRC) protocol specification (Release 16).
Extended European Search Report issued in corresponding European application No. 20967648.5, mailed Nov. 27, 2023.
Notice of Priority Examination of Patent Application issued in corresponding Chinese Application No. 202311341083.6, dated Sep. 19, 2024, 8 pages.
Communication pursuant to Article 94(3) EPC issued in corresponding European Application No. 20967648.5, datead Aug. 27, 2024, 5 pages.
First Office Opinion Notice issued in corresponding Chinese Application No. 202311341083.6, dated Sep. 25, 2024, 12 pages.
Second Examination Opinion Notice issued in corresponding Chinese Application No. 202311341083.6, dated Dec. 14, 2024, 16 pages.

* cited by examiner

300 | A terminal device receives authorization configuration information, the authorization configuration information comprising emergency communication service authorization indication information associated with the identifier of at least one sub-network supported by a cell — S310

FIG. 3

400 | A network device sends authorization configuration information, the authorization configuration information comprising emergency communication service authorization indication information associated with the identifier of at least one sub-network supported by a cell — S410

AUTHORIZATION CONFIGURATION METHOD, TERMINAL DEVICE, AND NETWORK DEVICE

CROSS-REFERENCE TO RELATED APPLICATION

This application is a continuation of International Application No. PCT/CN2020/141832, filed Dec. 30, 2020, which is hereby incorporated by reference in its entirety.

TECHNICAL FIELD

This application relates to the field of communications, and more particularly, to an authorization configuration method, a terminal device and a network device.

BACKGROUND

Emergency communication is a means of communication for emergency. For example, emergency communication services may include providing emergency assistance to users in situations where personal or public health, safety, life or property is in danger. The current use of emergency communication is very limited, which is not conducive to the development of emergency communication services. In severe cases, users may be in distress but cannot initiate emergency communication.

SUMMARY

Some embodiments of this application provide an authorization configuration method, a terminal device, and a network device, which can flexibly support emergency communication services.

Some embodiments of this application provide an authorization configuration method, including: receiving, by a terminal device, authorization configuration information, where the authorization configuration information includes emergency communication service authorization indication information associated with an identifier of at least one sub-network supported by a cell.

Some embodiments of this application provide an authorization configuration method, including: sending, by a network device, authorization configuration information, where the authorization configuration information includes emergency communication service authorization indication information associated with an identifier of at least one sub-network supported by a cell.

Some embodiments of this application provide a terminal device, including:
 a receiving unit, configured to receive authorization configuration information, where the authorization configuration information includes emergency communication service authorization indication information associated with an identifier of at least one sub-network supported by a cell.

Some embodiments of this application provide a network device, including:
 a sending unit, configured to send authorization configuration information, where the authorization configuration information includes emergency communication service authorization indication information associated with an identifier of at least one sub-network supported by a cell.

Some embodiments of this application provide a terminal device, including a processor and a memory. The memory is used for storing a computer program, and the processor is used for calling and running the computer program stored in the memory, thereby causing a terminal device to implement the authorization configuration method as described above.

Some embodiments of this application provide a network device including a processor and a memory. The memory is used for storing a computer program, and the processor is used for calling and running the computer program stored in the memory, thereby causing a network device to implement the authorization configuration method as described above.

Some embodiments of this application provide a chip for implementing the authorization configuration method as described above.

Specifically, the chip includes a processor for calling and running a computer program from the memory, thereby causing a device installed with the chip to implement the authorization configuration method as described above.

Some embodiments of this application provide a computer-readable storage medium for storing a computer program which, when executed by a device, causes the device to implement the authorization configuration method as described above.

Some embodiments of this application provide a computer program product, including computer program instructions that cause a computer to implement the authorization configuration method as described above.

Some embodiments of this application provide a computer program which, when running on a computer, causes the computer to implement the authorization configuration method as described above.

In some embodiments of this application, based on the emergency communication service authorization indication information associated with the identifier of at least one sub-network supported by the cell, it is beneficial to support the emergency communication service more flexibly.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

DETAILED DESCRIPTION

The technical solutions in some embodiments of this application will be described below with reference to the accompanying drawings in some embodiments of this application.

The technical solutions of some embodiments of this application may be applied to various communication systems, for example: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of NR system, an LTE-based access to unlicensed spectrum (LTE-U) system, an NR-based access to unlicensed spectrum (NR-U) system, a Non-Terrestrial Networks (NTN) system, a Universal Mobile Telecommunication System (UMTS), Wireless Local Area Networks (WLAN), Wireless Fidelity (WiFi), 5th-Generation (5G) system or other communication systems.

Generally speaking, traditional communication systems support a limited number of connections and are easy for implementation. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, Vehicle to everything (V2X) communication, and the like, and some embodiments of this application may also be applied to these communication systems.

Optionally, the communication system in some embodiments of this application may be applied to a Carrier Aggregation (CA) scenario, a Dual Connectivity (DC) scenario, or a Standalone (SA) networking scenario.

Optionally, the communication system in some embodiments of this application may be applied to an unlicensed spectrum, where the unlicensed spectrum may also be considered as a shared spectrum. Alternatively, the communication system in some embodiments of this application may also be applied to a licensed spectrum, where the licensed spectrum may also be considered as an unshared spectrum.

Some embodiments of this application are described in conjunction with network device and terminal device, where the terminal device may also be referred to as User Equipment (UE), access terminal, subscriber unit, subscriber station, mobile station, mobile site, remote station, remote terminal, mobile device, user terminal, terminal, wireless communication device, user agent, user device, or the like.

The terminal device may be a STAION (ST) in the WLAN, may be a cellular phone, a cordless phone, a Session Initiation Protocol (SIP) phone, a Wireless Local Loop (WLL) station, a Personal Digital Assistant (PDA) devices, a handheld device or computing device with wireless communication capabilities, other processing devices, in-vehicle devices, wearable devices connected to wireless modems, a terminal device in the next-generation communication systems such as the NR network, a terminal device in the future-evolved Public Land Mobile Network (PLMN) network, or the like.

In some embodiments of this application, the terminal device may be deployed on land, including indoor or outdoor, handheld, wearable, or vehicle-mounted; it may also be deployed on water (e.g., ships, etc.); it may also be deployed in the air (e.g., airplanes, balloons, and satellites etc.).

In some embodiments of this application, the terminal device may be a mobile phone, a tablet computer (Pad), a computer with a wireless transceiver function, a virtual reality (VR) terminal device, an augmented reality (AR) terminal device, a wireless terminal device in industrial control, a wireless terminal device in self-driving, a wireless terminal device in remote medical, a wireless terminal device in smart grid, a wireless terminal device in transportation safety, a wireless terminal device in smart city, a wireless terminal device in smart home, or the like.

As an example without being limited, in some embodiments of this application, the terminal device may also be a wearable device. Wearable devices may also be called wearable smart devices, which are the general term for the intelligent design of daily wear and the development of wearable devices using wearable technology, such as glasses, gloves, watches, clothing and shoes. A wearable device is a portable device that is worn directly on the body or integrated into the user's clothing or accessories. Wearable device is not only a hardware device, but also realizes powerful functions through software support, data interaction, and cloud interaction. In a broad sense, wearable smart devices include full-featured, large-scale, complete or partial functions without relying on smart phones, such as smart watches or smart glasses; and include those focusing on a certain type of application function and requiring cooperation with other devices such as smart phones, for example, all kinds of smart bracelets, smart jewelry, and the like for physical sign monitoring.

In some embodiments of this application, the network device may be a device for communicating with a mobile device, and the network device may be an Access Point (AP) in WLAN, or a Base Transceiver Station (BTS) in GSM or CDMA. It may also be a NodeB (NB) in WCDMA, an Evolutional Node B (eNB or eNodeB) in LTE, a relay station or access point, an in-vehicle device, a wearable device, a network device (gNB) in the NR network, a network device in the future-evolved PLMN network, a network device in the NTN network, or the like.

As an example without being limited, in some embodiments of this application, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite or the like. Optionally, the network device may also be a base station provided in a location such as land or water.

In some embodiments of this application, the network device may provide services for a cell, and the terminal device communicates with the network device through transmission resources (e.g., frequency domain resources, or spectrum resources) used by the cell, and the cell may correspond to a network device (e.g., a base station). The cell may belong to a macro base station, or belong to a base station corresponding to a small cell. The small cell may include a metro cell, a micro cell, a pico cell, a femto cell, or the like. These small cells have the characteristics of small coverage and low transmission power, and are suitable for providing high-speed data transmission services.

Figure 1:
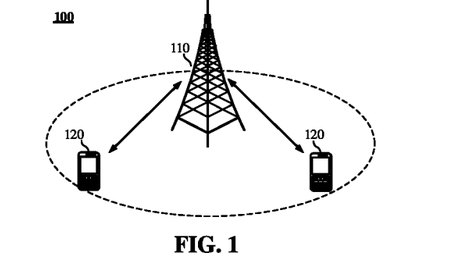
FIG. 1 is a schematic diagram of an application scenario according to some embodiments of this application.

FIG. 1 exemplarily shows a communication system 100. The communication system includes one network device 110 and two terminal devices 120. Optionally, the communication system 100 may include multiple network devices 110, and the coverage of each network device 110 may include other numbers of terminal devices 120, which are not limited in some embodiments of this application.

Optionally, the communication system 100 may further include a Mobility Management Entity (MME), an Access and Mobility Management Function (AMF) and other network entities, which are not limited in some embodiments of this application.

In some embodiments, the network device may further include an access network device and a core network device. In other words, the wireless communication system further includes a plurality of core networks for communicating with the access network device. The access network device may be an evolutional node B (may be referred to as eNB or e-NodeB for short), a macro base station, a micro base station (also called a "small base station"), a pico base station, an access point (AP), a transmission point (TP), or a new generation Node B (gNodeB) and the like in the LTE system, the NR system, or an authorized auxiliary access long-term evolution (LAA-LTE) system.

It should be understood that, in some embodiments of this application, a device having a communication function in the network/system may be referred to as a communication device. Taking the communication system shown in FIG. 1 as an example, the communication device may include the network device and the terminal device with a communication function, and the network device and the terminal device may be specific devices in some embodiments of the application, which will not be repeated here. It may also include other devices in the communication system, for example, other network entities such as a network controller and a mobility management entity, which are not limited in some embodiments of this application.

It should be understood that the terms "system" and "network" are often used interchangeably herein. The term "and/or" in this article is only used for describing an association relationship between the associated objects, indicating that there may be three kinds of relationships. For example, A and/or B may include three cases: A exists alone, both A and B exist, and B exists alone. In addition, the character "/" in this document generally indicates that the related objects are in an "or" relationship.

It should be understood that the "indication" mentioned in some embodiments of this application may be a direct indication, an indirect indication, or an associated relationship. For example, if A indicates B, it may represent that A directly indicates B, for example, B may be obtained through A. It may also represent that A indicates B indirectly, for example, A indicates C, and B may be obtained through C. It may also represent that there is an association relation between A and B.

In the description of some embodiments of this application, the term "corresponding" may indicate that there is a direct or indirect corresponding relationship between two objects, or may indicate that there is an associated relationship, a relationship of indicating and being indicated, or a relationship of configuring and being configured between the two objects.

In order to facilitate the understanding of the technical solutions of some embodiments of this application, related art of some embodiments of this application are described below. The following related art may be arbitrarily combined with the technical solutions according to some embodiments of this application as optional solutions, which falls within the protection scope of some embodiments of this application.

1) 5G Technology Overview

At present, with people's pursuit of speed, delay, high-speed mobility, energy efficiency, and the diversity and complexity of services in future life, the 3rd Generation Partnership Project (3GPP) international standards organization has begun to develop 5G. The main application scenarios of 5G may include Enhanced Mobile Broadband (eMBB), Ultra Reliability and Low Latency Communication (URLLC), and Massive Machine Type Communications (mMTC).

eMBB is still aimed at users' access to multimedia content, services and data, and its demand is growing rapidly. Since eMBB may be deployed in different scenarios, such as indoors, urban areas, and rural areas. Its capabilities and requirements are quite different and, thus, require analysis on specific deployment scenarios in detail rather than being generalized. Typical applications of URLLC include industrial automation, power automation, telemedicine operations (surgery), traffic safety assurance, and the like. The typical features of mMTC include high connection density, small data volume, delay-insensitive services, low cost and long service life of modules.

In the 5G network environment, a new Radio Resource Control (RRC) state, that is, the RRC_INACTIVE (inactive) state, is introduced for the purpose of reducing air interface signaling and quickly restoring wireless connections and data services. This state is different from the RRC_IDLE (idle) and RRC_CONNECTED (connected) states.

In the RRC_IDLE state, mobility is UE-based cell selection and reselection, paging is initiated by the Core Network (CN), and the paging area is configured by the CN. There is no RRC connection or UE Access Stratum (AS) context at the base station side.

In the RRC_CONNECTED state, the RRC connection exists, and the UE AS context exists at the base station and the UE. The network side knows that the location of the UE at the level of specific cell. Mobility is controlled by the network side. Unicast data may be transmitted between the UE and the base station.

In the RRC_INACTIVE state, mobility is UE-based cell selection and reselection, and the CN and the anchor RAN are still in the connection of connected state. The UE AS context exists on a certain base station. Paging is triggered by the Radio Access Network (RAN), and the RAN-based paging area is managed by the RAN. The network side knows the location of the UE at the level of RAN-based paging area.

2) Characteristics of NR NPN Network Deployment

NR R16 includes Non-Public Network (NPN) networks. In order to increase the flexibility of NPN network deployment, NPN networks may be divided into Stand-alone Non-public Networks (SNPN) and Closed Access Group (CAG) networks. The former identifies a SNPN network through PLMN ID+NID (Network Identifier), and the latter identifies a CAG network through PLMN ID+CAG ID.

A PLMN can support any network sharing and combination mode of common public network, SNPN and CAG network at the same time. For example, a PLMN can support the common public network, SNPN or CAG network separately, or support the common public network and SNPN to share a PLMN network. Even common public network, SNPN and CAG network share a PLMN network at the same time are allowable.

Figure 2:
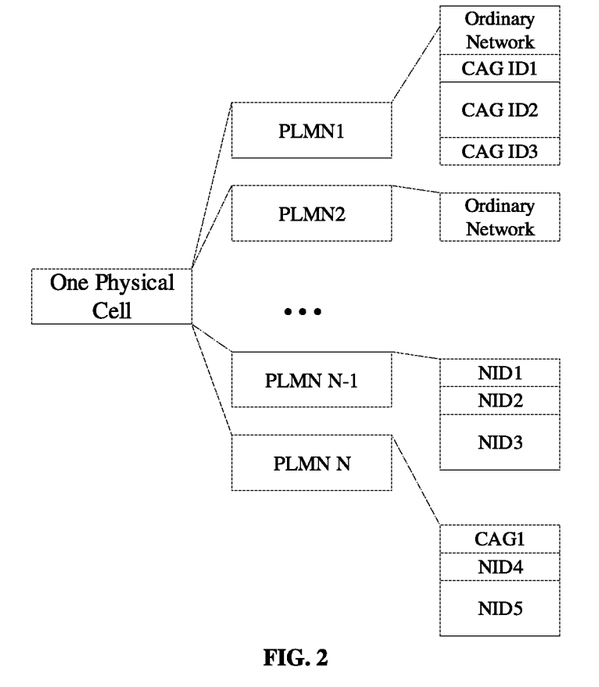
FIG. 2 is a schematic diagram of a networking combination relationship among a common public network, an SNPN, and a CAG network according to some embodiments of this application.

FIG. 2 is a schematic diagram of the networking combination relationship among the common public network, SNPN and CAG network, which more clearly reflects the networking combination relationship among the common public network, SNPN and CAG network. For example, a physical cell may be shared by multiple PLMN networks at the same time, and each PLMN logical cell may form its own unique non-public network. For example, a common public network and three different CAG sub-networks (see CAG ID1, CAG ID2, and CAG ID3) are simultaneously deployed in the PLMN1 logical cell in FIG. 2. Only three SNPN sub-networks (see NID1, NID2, NID3) are deployed in the PLMN N−1 logical cell. In other words, any network sharing combination of common public network, SNPN and CAG network may be freely deployed under a PLMN. Exemplarily, it may be specified that the number of independent SNPN sub-networks, the number of independent CAG sub-networks or the number of SNPN+CAG sub-networks deployed in one physical cell cannot exceed 12.

3) Suitable Cell Refers to a Cell where the Terminal may Normally Reside.

4) Frequency Point Priority

When configuring a frequency point, the network side may configure the priority information of the frequency point at the same time. For example, a frequency point priority ranges from 0 to 7, where 0 means the lowest priority, and 7 means the highest priority. For the configuration diversity of frequency point priority, it may be specified that each of the priority values 0 to 7 may be associated with a decimal place value. For example, the value range of the decimal place is {0.2, 0.4, 0.6, 0.8}, and there are a total of 40 frequency priority combinations when taking the integer place and the decimal place in combination.

The frequency point priority may be configured through system information or dedicated signaling. The frequency point priority configured by dedicated signaling may be associated with a valid duration. During the valid duration, a dedicated frequency point priority may always cover a public frequency point priority broadcast in the system information. When the valid duration expires, the terminal may only use the public frequency priority.

5) Cell Selection and Reselection Rule of the Terminal in the NPN Network

As far as cell selection is concerned, when a cell selected by the terminal satisfies the suitable cell criterion, and the terminal may choose to reside in the cell to complete the cell selection.

As far as cell reselection is concerned, when a reselected target cell satisfies both the suitable cell criterion and the reselection criteria condition defined based on an absolute frequency point priority, the terminal may reselect to the corresponding cell that satisfies the foregoing conditions to complete the cell reselection.

The above-mentioned reselection criteria defined based on the absolute frequency point priority may include the following three:

high-priority frequency point re-selection criterion;
same-priority frequency point reselection criterion or same-frequency reselection criterion, also known as the R criterion; and
low-priority frequency point re-selection criterion.

6) Automatic Neighbor Relation (ANR)

A newly deployed cell may have an impact on the relation between neighboring cells. The surrounding neighboring cells may not always obtain the latest neighbor relation information from Operation and Maintenance (OAM). NR allows the terminal to report information about neighboring cells obtained by itself under the configuration of the network side, such as the Cell Global Identifier (CGI)/SFN and Frame Timing Difference (SFTD).

7) Network-Side Emergency Communication Service Indication

Currently, the emergency communication service indication information on the network side is configured with a granularity of cell identifier. In other words, all PLMNs supported by the cell share one piece of emergency communication service indication information, and the emergency communication is supported by either all or none of these PLMNs. Moreover, in NR R16, the SNPN network does not support the emergency communication service.

The deployment of NPN networks such as SNPN and CAG is becoming more and more flexible. With authorization of an operator, third parties may even deploy their own NPN networks. However, the emergency communication authority is cell-level, and the SNPN network does not even support the emergency communication, thereby leading to very limited use of emergency communication, which is not conducive to the development of emergency communication services. In severe cases, users may be in distress but cannot initiate emergency communication.

Figure 3:
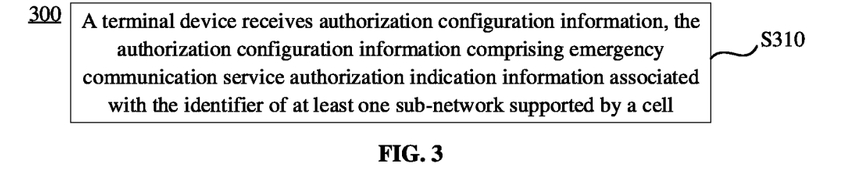
FIG. 3 is a schematic flowchart of an authorization configuration method according to some embodiments of this application.

FIG. 3 is a schematic flowchart of an authorization configuration method 300 according to some embodiments of this application. The method may optionally be applied to the system shown in FIG. 1, but is not limited thereto. The method includes at least some of the following content.

In S310, the terminal device receives authorization configuration information, where the authorization configuration information includes information indicating authorization of emergency communication service (also referred to as "emergency communication service authorization indication information" for short here below) associated with an identifier of at least one sub-network supported by a cell.

In some embodiments of this application, the types of sub-networks supported by the cell may include one or more of PLMN, SNPN, CAG network, temporary network, and access-control-related network. The PLMN has PLMN ID, the SNPN has SNPN ID, and the CAG network has CAG ID. In some embodiments, the SNPN ID may be represented by a combination of PLMN ID and NID.

It should be understood that the access-control-related network identifier may be similar to the PLMN ID or SNPN ID, that is, the actual meanings thereof are the same, but a length of the access-control-related network identifier may be different from that of the PLMN ID or SNPN ID. Similarly, the temporary network identifier may be similar to the PLMN ID or SNPN ID, that is, the actual meanings thereof are the same, but the temporary network identifier is a temporary identifier of the PLMN or SNPN.

Exemplarily, the terminal device may receive the authorization configuration information from the network device such as a base station. The emergency communication service authorization indication information associated with the identifier of at least one sub-network supported by the cell in the authorization configuration information may include an identifier of a sub-network supported by the cell (the current cell) accessed by the terminal device and the emergency communication service authorization indication information associated thereto. The emergency communication service authorization indication information associated with the identifier of at least one sub-network supported by the cell in the authorization configuration information may also include only the emergency communication service authorization indication information. For example, if it is pre-agreed that the identifiers of all sub-networks supported by the cell are associated with the same emergency communication service authorization indication information, the association relationship in the authorization configuration information may include the emergency communication service authorization indication information.

Optionally, in some embodiments of this application, the authorization configuration information is carried in a cell system broadcast message.

After receiving the cell system broadcast message, the terminal device may parse the message to obtain the authorization configuration information, thereby acquiring the emergency communication service authorization indication information associated with the identifier of at least one sub-network supported by the cell.

Optionally, in some embodiments of this application, when referring to the terminal device receives the authorization configuration information, it includes: the AS of the terminal device delivers the received authorization configuration information to the Non-Access Stratum (NAS) of the terminal device.

In some embodiments of this application, if the AS of the terminal device, after receiving the cell system broadcast message, delivers the authorization configuration information in the cell system broadcast message to the NAS of the terminal device, it indicates that the authorization configuration information is successfully received. The NAS may determine whether to initiate an emergency communication service by using the authorization configuration information. The emergency communication service may include, for example, fire alarm, public security alarm, emergency rescue and disaster relief, public safety, and the like.

Optionally, in some embodiments of this application, the method further includes: the terminal device determines, based on the authorization configuration information, the emergency communication service support situation of at least one sub-network supported by the accessed cell.

Exemplarily, the authorization configuration information received by the terminal device may include emergency communication service indication information of multiple sub-networks supported by the cell accessed by the terminal device. Based on the authorization configuration information, the terminal device may determine the support situation of these sub-networks related to one or more emergency communication services.

For example, the authorization configuration information includes PLMN ID 1 associated with emergency communication service authorization indication information 1. In addition, the emergency communication service authorization indication information 1 indicates that the emergency service 1 is supported. The terminal device may determine that the PLMN identified by PLMN ID 1 supports the emergency service 1.

For another example, the authorization configuration information includes PLMN ID 1 associated with emergency communication service authorization indication information 1. The authorization configuration information includes PLMN ID 2 associated with emergency communication service authorization indication information 2. Moreover, the emergency communication service authorization indication information 1 indicates that the emergency service 1 is supported, and the emergency communication service authorization indication information 2 indicates that the emergency service 2 is supported. The terminal device may determine that the PLMN identified by PLMN ID 1 supports emergency service 1 and that PLMN ID 2 supports emergency service 2, or it may only determine that the PLMN identified by PLMN ID 1 supports emergency service 1.

For yet another example, SNPN ID 1, SNPN ID 2, and SNPN ID 3 included in the authorization configuration information are all associated with emergency communication service authorization indication information 1. In addition, the emergency communication service authorization indication information 1 indicates that the emergency service 1 is supported. The terminal device may determine that the SNPN identified by SNPN ID 1 supports emergency service 1 and that the SNPN identified by SNPN ID 2 supports emergency service 1.

Optionally, in some embodiments of this application, the identifier of at least one sub-network supported by the cell includes at least one of the following: an identifier of a PLMN (also referred to as "PLMN identifier" in short hereafter) supported by the cell; an identifier of a SNPN (also referred to as "SNPN identifier" in short hereafter) supported by the cell; an identifier of a CAG (also referred to as "CAG identifier" in short hereafter) supported by the cell; a temporary network identifier; an access-control-related network identifier.

Exemplarily, the emergency communication service authorization indication information associated with the identifier of at least one sub-network supported by the cell may include at least one of the following:
  emergency communication service authorization indication information associated with at least one PLMN identifier supported by the cell;
  emergency communication service authorization indication information associated with at least one SNPN identifier supported by the cell;
  emergency communication service authorization indication information associated with at least one CAG identifier supported by the cell;
  emergency communication service authorization indication information associated with at least one temporary network identifier supported by the cell;
  emergency communication service authorization indication information associated with at least one access-control-related network identifier supported by the cell.

Optionally, in some embodiments of this application, a configuration granularity of the authorization configuration information includes at least one of the following: PLMN identifier granularity; SNPN identifier granularity; CAG identifier granularity; temporary network identifier granularity; access-control-related network identifier granularity.

Optionally, in some embodiments of this application, the authorization configuration information of the PLMN identifier granularity includes at least one of the following:
  each PLMN identifier supported by the cell is associated with one piece of emergency communication service authorization indication information.

For example, multiple PLMN identifiers supported by a cell are PLMN ID1, PLMN ID2 and PLMN ID3, respectively. PLMN ID1 is associated with emergency communication service authorization indication information 1, PLMN ID2 is associated with emergency communication service authorization indication information 2, and PLMN ID3 is associated with emergency communication service authorization indication information 3.

Optionally, in some embodiments of this application, the authorization configuration information of the SNPN identifier granularity, the temporary network identifier granularity, or the access-control-related network identifier granularity includes at least one of the following:

at least one of multiple SNPN identifiers, multiple temporary network identifiers, and multiple access-control-related network identifiers supported by the cell is associated with one piece of emergency communication service authorization indication information;

each SNPN identifier, each temporary network identifier or each access-control-related network identifier supported by the cell is associated with one piece of emergency communication service authorization indication information.

Exemplarily, multiple SNPN identifiers supported by a cell are associated with one piece of emergency communication service authorization indication information. Specifically, for example, multiple SNPN identifiers supported by a cell are SNPN ID1, SNPN ID2, and SNPN ID3, respectively. SNPN ID1, SNPN ID2 and SNPN ID3 are all associated with emergency communication service authorization indication information 1. Alternatively, SNPN ID1 and SNPN ID2 are associated with emergency communication service authorization indication information 1, and SNPN ID3 is associated with emergency communication service authorization indication information 2.

Exemplarily, each SNPN identifier supported by a cell is associated with one piece of emergency communication service authorization indication information. Specifically, for example, multiple SNPN identifiers supported by a cell are SNPN ID1, SNPN ID2, and SNPN ID3, respectively. SNPN ID1 is associated with emergency communication service authorization indication information 1, SNPN ID2 is associated with emergency communication service authorization indication information 2, and SNPN ID3 is associated with emergency communication service authorization indication information 3. Alternatively, SNPN ID1 is associated with emergency communication service authorization indication information 1, and SNPN ID2 and SNPN ID3 are associated with emergency communication service authorization indication information 2.

Exemplarily, multiple temporary network identifiers supported by a cell are associated with one piece of emergency communication service authorization indication information. Specifically, for example, the multiple temporary network identifiers supported by a cell are temporary network identifier 1, temporary network identifier 2, and temporary network identifier 3, respectively. Temporary network identifier 1, temporary network identifier 2 and temporary network identifier 3 are all associated with the emergency communication service authorization indication information 2.

Exemplarily, each temporary network identifier supported by a cell is associated with one piece of emergency communication service authorization indication information. Specifically, for example, the multiple temporary network identifiers supported by one cell are temporary network identifier 1, temporary network identifier 2, and temporary network identifier 3, respectively. Temporary network identifier 1 is associated with the emergency communication service authorization indication information 1, temporary network identifier 2 is associated with the emergency communication service authorization indication information 2, and temporary network identifier 3 is associated with the emergency communication service authorization indication information 3. Alternatively, temporary network identifier 1 is associated with the emergency communication service authorization indication information 1, and temporary network identifier 2 and temporary network identifier 3 are associated with the emergency communication service authorization indication information 3.

Exemplarily, multiple access-control-related network identifiers supported by a cell are associated with one piece of emergency communication service authorization indication information. Specifically, for example, the multiple access-control-related network identifiers supported by a cell are respectively access-control-related network identifier 1, access-control-related network identifier 2, and access-control-related network identifier 3. Access-control-related network identifier 1, access-control-related network identifier 2, and access-control-related network identifier 3 are all associated with emergency communication service authorization indication information 3.

Exemplarily, each temporary network identifier supported by a cell is associated with one piece of emergency communication service authorization indication information. Specifically, for example, the multiple access-control-related network identifiers supported by a cell are respectively access-control-related network identifier 1, access-control-related network identifier 2, and access-control-related network identifier 3. Access-control-related network identifier 1 is associated with the emergency communication service authorization indication information 1, access-control-related network identifier 2 is associated with the emergency communication service authorization indication information 2, and access-control-related network identifier 3 is associated with the emergency communication service authorization indication information 3. Alternatively, access-control-related network identifier 2 is associated with the emergency communication service authorization indication information 2, and access-control-related network identifier 1 and access-control-related network identifier 3 are associated with the emergency communication service authorization indication information 3.

Exemplarily, multiple SNPN identifiers and multiple temporary network identifiers supported by a cell are associated with one piece of emergency communication service authorization indication information. Specifically, for example, SNPN ID1 and SNPN ID2 are supported by a cell, and access-control-related network identifier 1 and access-control-related network identifier 2 are supported by the cell. SNPN ID1, SNPN ID2, access-control-related network identifier 1, and access-control-related network identifier 2 are all associated with emergency communication service authorization indication information 1. Alternatively, SNPN ID1 and access-control-related network identifier 2 are associated with emergency communication service authorization indication information 1, and SNPN ID2 and access-control-related network identifier 1 are associated with emergency communication service authorization indication information 2.

Exemplarily, multiple SNPN identifiers, multiple temporary network identifiers, and multiple access-control-related network identifiers supported by a cell are associated with one piece of emergency communication service authorization indication information.

Specifically, for example, a cell supports SNPN ID1 and SNPN ID2, and this cell supports temporary network identifier 1 and temporary network identifier 2, and this cell supports access-control-related network identifier 1 and access-control-related network identifier 2. SNPN ID1, SNPN ID2, temporary network identifier 1, temporary network identifier 2, access-control-related network identifier 1, and access-control-related network identifier 2 are all associated with emergency communication service authorization indication information 1. Alternatively, SNPN ID1, temporary network identifier 1, and access-control-related network identifier 2 are associated with emergency communication service authorization indication information 1, and SNPN ID2, temporary network identifier 2, and access-control-related network identifier 1 are associated with emergency communication service authorization indication information 2.

Exemplarily, when referring to that each SNPN identifier, each temporary network identifier or each access-control-related network identifier supported by the cell is associated with one piece of emergency communication service authorization indication information, it may include at least one of the following situations.

Each SNPN identifier among all SNPN identifiers supported by the cell is associated with one piece of emergency communication service authorization indication information. Specifically, for example, multiple SNPN identifiers supported by a cell are SNPN ID1, SNPN ID2, and SNPN ID3, respectively. SNPN ID1 is associated with emergency communication service authorization indication information 1, SNPN ID2 is associated with emergency communication service authorization indication information 2, and SNPN ID3 is associated with emergency communication service authorization indication information 3.

Each SNPN identifier in the partial SNPN identifiers supported by the cell is associated with one piece of emergency communication service authorization indication information. Specifically, for example, multiple SNPN identifiers supported by a cell are SNPN ID1, SNPN ID2, and SNPN ID3, respectively. SNPN ID1 is associated with emergency communication service authorization indication information 1, and SNPN ID2 is associated with emergency communication service authorization indication information 2.

Each temporary network identifier among all temporary network identifiers supported by the cell is associated with one piece of emergency communication service authorization indication information. Specifically, for example, multiple temporary network identifiers supported by a cell are temporary network identifier 1, temporary network identifier 2, and temporary network identifier 3, respectively. Temporary network identifier 1 is associated with emergency communication service authorization indication information 1, temporary network identifier 2 is associated with emergency communication service authorization indication information 2, and temporary network identifier 3 is associated with emergency communication service authorization indication information 3.

Each temporary network identifier in the partial temporary network identifiers supported by the cell is associated with one piece of emergency communication service authorization indication information. Specifically, for example, multiple temporary network identifiers supported by a cell are temporary network identifier 1, temporary network identifier 2, and temporary network identifier 3, respectively. Temporary network identifier 1 is associated with emergency communication service authorization indication information 1, and temporary network identifier 2 is associated with emergency communication service authorization indication information 2.

Each access-control-related network identifier in all access-control-related network identifiers supported by the cell is associated with one piece of emergency communication service authorization indication information. Specifically, for example, multiple access-control-related network identifiers supported by a cell are respectively access-control-related network identifier 1, access-control-related network identifier 2, and access-control-related network identifier 3. Access-control-related network identifier 1 is associated with emergency communication service authorization indication information 1, access-control-related network identifier 2 is associated with emergency communication service authorization indication information 2, and access-control-related network identifier 3 is associated with emergency communication service authorization indication information 3.

Each access-control-related network identifier in the partial access-control-related network identifiers supported by the cell is associated with one piece of emergency communication service authorization indication information. Specifically, for example, multiple access-control-related network identifiers supported by a cell are respectively access-control-related network identifier 1, access-control-related network identifier 2, and access-control-related network identifier 3. Access-control-related network identifier 1 is associated with emergency communication service authorization indication information 1, and access-control-related network identifier 2 is associated with emergency communication service authorization indication information 2.

Optionally, in some embodiments of this application, at least two of all PLMN identifiers, all SNPN identifiers, all temporary network identifiers, and all access-control-related network identifiers supported by the cell are associated with the same emergency communication service authorization indication information.

For example, all PLMN identifiers and all SNPN identifiers supported by the cell are associated with the same emergency communication service authorization indication information. For another example, all PLMN identifiers and all temporary network identifiers supported by the cell are associated with the same emergency communication service authorization indication information. For another example, all PLMN identifiers and all access-control-related network identifiers supported by the cell are associated with the same emergency communication service authorization indication information. For another example, all SNPN identifiers and all temporary network identifiers supported by the cell are associated with the same emergency communication service authorization indication information. For another example, all SNPN identifiers and all access-control-related network identifiers supported by the cell are associated with the same emergency communication service authorization indication information. For another example, all temporary network identifiers and all access-control-related network identifiers supported by the cell are associated with the same emergency communication service authorization indication information. For another example, all PLMN identifiers, all SNPN identifiers and all temporary network identifiers supported by the cell are associated with the same emergency communication service authorization indication information. For another example, all PLMN identifiers, all SNPN identifiers, and all access-control-related network identifiers supported by the cell are associated with the same emergency communication service authorization indication information.

Optionally, in some embodiments of this application, the authorization configuration information of the CAG identifier granularity includes at least one of the following:

each CAG identifier, corresponding to each PLMN identifier supported by the cell, is associated with one piece of emergency communication service authorization indication information;

multiple CAG identifiers supported by the cell are associated with one piece of emergency communication service authorization indication information.

For example, the PLMN identifiers supported by a cell include PLMN ID1 and PLMN ID2. Among them, PLMN ID1 is associated with multiple CAG IDs including CAG ID1 and CAG ID2, and PLMN ID2 is associated with multiple CAG IDs including CAG ID3 and CAG ID4. CAG ID1 is associated with emergency communication service authorization indication information 1, CAG ID2 is associated with emergency communication service authorization indication information 2, CAG ID3 is associated with emergency communication service authorization indication information 3, and CAG ID4 is associated with emergency communication service authorization indication information 4.

For example, the PLMN identifiers supported by a cell include PLMN ID1 and PLMN ID2. Among them, PLMN ID1 is associated with multiple CAG IDs including CAG ID1 and CAG ID2, and PLMN ID2 is associated with multiple CAG IDs including CAG ID3 and CAG ID4. CAG ID1, CAG ID2, CAG ID3 and CAG ID4 are associated with emergency communication service authorization indication information 1. Alternatively, CAG ID1 and CAG ID2 are associated with emergency communication service authorization indication information 1, and CAG ID3 and CAG ID4 are associated with emergency communication service authorization indication information 2. Alternatively, CAG ID1 and CAG ID3 are associated with emergency communication service authorization indication information 1, and CAG ID2 and CAG ID4 are associated with emergency communication service authorization indication information 2. Alternatively, CAG ID1, CAG ID1 and CAG ID3 are associated with emergency communication service authorization indication information 1, and CAG ID4 is associated with emergency communication service authorization indication information 2.

Optionally, in some embodiments of this application, the emergency communication service authorization indication information includes at least one of the following:
  authorization indication information on whether the terminal device is supported to initiate an emergency communication service;
  terminal configuration requirement information for allowing the terminal device to initiate an emergency communication service;
  authorization indication information on whether an emergency communication service is supported by one or more associated sub-network identifiers.

In some embodiments of this application, the authorization indication information on whether the terminal device is supported to initiate an emergency communication service, and the terminal configuration requirement information for allowing the terminal device to initiate an emergency communication service may be requirements for the terminal device. The authorization indication information on whether the terminal device is supported to initiate an emergency communication service may include: prohibiting the terminal device from initiating the emergency communication service, allowing the terminal device to initiate the emergency communication service, and the like. The terminal configuration requirement information for allowing the terminal device to initiate an emergency communication service may include at least one of the following: terminal capabilities, such as radio frequency capabilities, service capabilities, and the like; emergency communication service restriction configuration information maintained by NAS of the terminal.

In some embodiments of this application, based on the emergency communication service authorization indication information associated with the identifier of at least one sub-network supported by the cell, the configuration granularity is finer, which is beneficial to support the emergency communication service more flexibly.

Whether one or more sub-network identifiers associated with the emergency communication service authorization indication information supports the emergency communication service may be a requirement for the network device. For example, in the case that an SNPN does not support the emergency communication service, the network may firstly notify the UE that an SNPN supports the emergency communication service. If SNPN ID1 is associated with emergency communication service authorization indication information 1, the emergency communication service authorization indication information 1 may include one or more indication bits to indicate whether the SNPN ID1 (i.e., the SNPN identified thereby) supports the emergency communication service.

Figure 4:
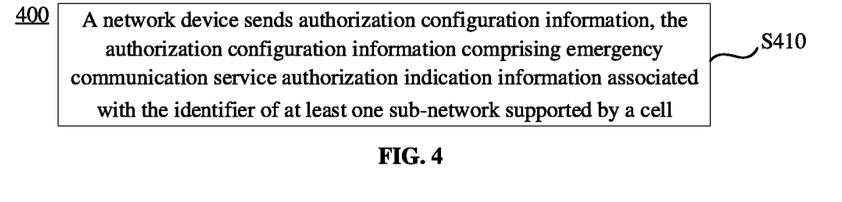
FIG. 4 is a schematic flowchart of an authorization configuration method according to some other embodiments of this application.

FIG. 4 is a schematic flowchart of an authorization configuration method 400 according to some embodiments of this application. The method may optionally be applied to the system shown in FIG. 1, but is not limited thereto. The method includes at least some of the following.

In S410, the network device sends authorization configuration information, where the authorization configuration information includes emergency communication service authorization indication information associated with an identifier of at least one sub-network supported by a cell.

Optionally, in some embodiments of this application, the interface used by the network device to transmit the authorization configuration information further includes at least one of the following: X2 interface; Xn interface; S1 interface; NG interface; F1 interface; E1 interface.

Exemplarily, meanings of the above interfaces are as follows:
  X2 interface is the communication interface between 4G wireless access network nodes;
  Xn interface is the communication interface between 5G wireless access network nodes;
  S1 interface is the communication interface between a 4G wireless access network node and a 4G core network;
  NG interface is the communication interface between a 5G radio access network node and a 5G core network;
  F1 interface is the communication interface between a Central Unit (gNB-CU) and a Distributed Unit (gNB-DU) that are radio access network nodes using NR technology;
  E1 interface is the communication interface between a Control Plane (gNB-CU-CP) part in the gNB-CU and a User Plane (gNB-CU-UP) part in the gNB-CU.

Delivering the authorization configuration information through the interfaces of network devices is helpful for the network devices to obtain an authorization status of emergency communication service of neighboring cells. For example, in the case that the terminal device service needs to be handed over between different cells, the cell to be subsequently handed over may be selected based on the emergency communication service authorization status of the neighboring cells.

Optionally, in some embodiments of this application, the identifier of at least one sub-network supported by the cell includes at least one of the following: a PLMN identifier supported by the cell; an SNPN identifier supported by the cell; a CAG identifier supported by the cell; a temporary network identifier; an access-control-related network identifier.

Exemplarily, the emergency communication service authorization indication information associated with the identifier of at least one sub-network supported by the cell may include at least one of the following:

emergency communication service authorization indication information associated with at least one PLMN identifier supported by the cell;

emergency communication service authorization indication information associated with at least one SNPN identifier supported by the cell;

emergency communication service authorization indication information associated with at least one CAG identifier supported by the cell;

emergency communication service authorization indication information associated with at least one temporary network identifier supported by the cell;

emergency communication service authorization indication information associated with at least one access-control-related network identifier supported by the cell.

Optionally, in some embodiments of this application, a configuration granularity of the authorization configuration information includes at least one of the following: PLMN identifier granularity; SNPN identifier granularity; CAG identifier granularity; temporary network identifier granularity; access-control-related network identifier granularity.

Optionally, in some embodiments of this application, the authorization configuration information of the PLMN identifier granularity includes at least one of the following:

each PLMN identifier supported by the cell is associated with one piece of emergency communication service authorization indication information.

Optionally, in some embodiments of this application, the authorization configuration information of the SNPN identifier granularity, the temporary network identifier granularity, or the access-control-related network identifier granularity includes at least one of the following:

at least one of multiple SNPN identifiers, multiple temporary network identifiers, and multiple access-control-related network identifiers supported by the cell is associated with one piece of emergency communication service authorization indication information;

each SNPN identifier, each temporary network identifier or each access-control-related network identifier supported by the cell is associated with one piece of emergency communication service authorization indication information.

Optionally, in some embodiments of this application, at least two of all PLMN identifiers, all SNPN identifiers, all temporary network identifiers, and all access-control-related network identifiers supported by the cell are associated with the same emergency communication service authorization indication information.

Optionally, in some embodiments of this application, the authorization configuration information of the CAG identifier granularity includes at least one of the following:

each CAG identifier, corresponding to each PLMN identifier supported by the cell, is associated with one piece of emergency communication service authorization indication information;

multiple CAG identifiers supported by the cell are associated with one piece of emergency communication service authorization indication information.

Optionally, in some embodiments of this application, the emergency communication service authorization indication information includes at least one of the following:

authorization indication information on whether the terminal device is supported to initiate an emergency communication service;

terminal configuration requirement information for allowing the terminal device to initiate an emergency communication service;

authorization indication information on whether an emergency communication service is supported by one or more associated sub-network identifiers.

Optionally, in some embodiments of this application, the authorization configuration information is carried in a cell system broadcast message.

The description of the method 400 implemented by the network device according to some embodiments that is the same as that of the method 300 has the same meaning. For details, reference may be made to the relevant description in the foregoing method 300, which is not repeated here for brevity.

In an application example, the emergency communication service may be indicated by using the authorization configuration method according to some embodiments of this application. The emergency communication service may also be referred to as a network emergency communication service. The authorization configuration method may specifically include:

the terminal determines the emergency communication service supporting status of any sub-network in the cell, such as SNPN, PLMN, CAG network, temporary network, access-control-related network, and the like, according to the emergency communication service authorization indication information associated with the sub-network contained in the cell system broadcast information.

Optionally, the emergency communication service authorization indication information is used for indicating whether a network associated therewith supports the terminal to initiate an emergency communication service.

Optionally, the emergency communication service authorization indication information may be configured according to any one of the following configuration granularities: cell identifier granularity; PLMN/SNPN identifier granularity; CAG identifier granularity; temporary network identifier granularity; access-control-related network identifier granularity.

Optionally, the cell system broadcast information may be SIB1 or any other SIB except SIB1.

Optionally, the emergency communication service authorization indication information may also be delivered through the Xn/NG/F1/E1/X2/S1 interface;

X2 interface is the communication interface between 4G wireless access network nodes;

Xn interface is the communication interface between 5G wireless access network nodes;

S1 interface is the communication interface between a 4G wireless access network node and a 4G core network;

NG interface is the communication interface between a 5G radio access network node and a 5G core network;

F1 interface is the communication interface between a Central Unit (gNB-CU) and a Distributed Unit (gNB-DU) that are radio access network nodes using NR technology;

E1 interface is the communication interface between a Control Plane (gNB-CU-CP) part in the gNB-CU and a User Plane (gNB-CU-UP) part in the gNB-CU.

Example 1: SNPN Network Emergency Communication Service Authorization Indication Information Configuration Method (Applicable to SNPN)

In an SNPN-identifier-granularity configuration mode 1, all SNPN IDs supported by a cell are associated with common network emergency communication service authorization indication information.

TABLE 1

Illustration of SNPN-identifier-granularity configuration mode 1

| | |
|---|---|
| SNPN ID 1 | network emergency communication service authorization indication information |
| SNPN ID 2 | |
| ... | |
| SNPN ID N | |

The network emergency communication service authorization indication information in Table 1 may include configuration information common to all SNPN networks supported by a cell.

In an SNPN-identifier-granularity configuration mode 2, each SNPN ID supported by a cell is associated with independent network emergency communication service authorization indication information.

TABLE 2

Illustration of SNPN-identifier-granularity configuration mode 2

| | |
|---|---|
| SNPN ID 1 | network emergency communication service authorization indication information 1 |
| SNPN ID 2 | network emergency communication service authorization indication information 2 |
| ... | ... |
| SNPN ID N | network emergency communication service authorization indication information N |

Each SNPN ID supported by the cell in Table 2 is associated with independent network emergency communication service authorization indication information.

Optionally, multiple SNPN IDs supported by the cell in Table 2 may be associated with one piece of network emergency communication service authorization indication information. For example, SNPN ID 1 and SNPN ID 2 are associated with network emergency communication service authorization indication information 1, while SNPN ID N is associated with network emergency communication service authorization indication information N.

Example 2: PLMN Network Emergency Communication Service Authorization Indication Information Configuration Method (Applicable to PLMN)

In a PLMN-identifier-granularity configuration mode, each PLMN ID supported by a cell is associated with independent network emergency communication service authorization indication information.

TABLE 3

Illustration of PLMN-identifier-granularity configuration mode

| | |
|---|---|
| PLMN ID 1 | network emergency communication service authorization indication information 1 |
| PLMN ID 2 | network emergency communication service authorization indication information 2 |
| ... | ... |
| PLMN ID N | network emergency communication service authorization indication information N |

Each PLMN ID supported by the cell in Table 3 is associated with independent network emergency communication service authorization indication information. Optionally, multiple PLMN IDs supported by the cell in Table 3 may be associated with one piece of network emergency communication service authorization indication information. For example, PLMN ID 1 and PLMN ID 2 are associated with network emergency communication service authorization indication information 1, while PLMN ID N is associated with network emergency communication service authorization indication information N.

In a CAG-identifier-granularity configuration method, each CAG ID associated with respective PLMN IDs supported by a cell is associated with independent network emergency communication service authorization indication information.

TABLE 4

Illustration of CAG-identifier-granularity configuration mode

| | | |
|---|---|---|
| PLMN ID 1 | CAG ID 11 | network emergency communication service authorization indication information 11 |
| | CAG ID 12 | network emergency communication service authorization indication information 12 |
| PLMN ID 2 | CAG ID 21 | network emergency communication service authorization indication information 21 |
| | CAG ID 22 | network emergency communication service authorization indication information 22 |
| ... | ... | ... |
| PLMN ID N | CAG ID N1 | network emergency communication service authorization indication information N1 |
| | CAG ID N2 | network emergency communication service authorization indication information N2 |

Each CAG ID associated with respective PLMN IDs in Table 4 is associated with independent network emergency communication service authorization indication information. Optionally, multiple CAG IDs supported by the cell in Table 4 may be associated with one piece of network emergency communication service authorization indication information. For example, CAG ID11, CAG ID12 are associated with network emergency communication service authorization indication information 11, and CAG ID 21 and CAG ID 22 are associated with network emergency communication service authorization indication information 22.

Example 3: SNPN and PLMN Network Emergency Communication Service Authorization Indication Information Configuration Method (Applicable to Both PLMN and SNPN)

In a cell-identifier-granularity configuration mode 1, all SNPN IDs and PLMN IDs supported by a cell are associated with common network emergency communication service authorization indication information.

TABLE 5

Illustration of cell-identifier-granularity configuration mode 1

| | |
|---|---|
| SNPN ID 1 | network emergency communication service authorization indication information |
| SNPN ID 2 | |
| ... | |
| SNPN ID N | |
| PLMN ID 1 | |
| PLMN ID 2 | |
| ... | |
| PLMN ID M | |

In Table 5, all SNPN IDs and PLMN IDs supported by a cell are associated with common network emergency communication service authorization indication information.

In a cell-identifier-granularity configuration mode 2, all SNPN IDs and PLMN IDs supported by a cell are associated with common network emergency communication service authorization indication information, but the SNPN network is further associated with a conditional execution.

TABLE 6

Illustration of cell-identifier-granularity configuration mode 2

| SNPN ID 1<br>SNPN ID 2<br>...<br>SNPN ID N | network emergency communication service authorization indication information | Whether to prohibit emergency communication service indication |
|---|---|---|
| PLMN ID 1<br>PLMN ID 2<br>...<br>PLMN ID M | | No parameter |

In Table 6, all SNPN IDs and PLMN IDs supported by a cell are associated with common network emergency communication service authorization indication information, but all SNPN IDs may further be associated with an indication of whether to prohibit emergency communication service. The indication of whether to prohibit emergency communication service may also be regarded as a part of the network emergency communication service authorization indication information. If the value of the emergency communication service indication information is indicative of 'prohibited', no matter what the value of the network emergency communication service authorization indication information is, the terminal cannot initiate an emergency communication service through any SNPN network in the cell. Only when the value of the emergency communication service indication information is indicative of 'allowed', may the terminal can finally decide, according to the value of the network emergency communication service authorization indication information, whether to initiate an emergency communication service through the PLMN or SNPN network supported by the cell.

M/N in the above-mentioned Tables 1 to 6 is a positive integer greater than or equal to 1.

The solutions of the above examples may be implemented in combination.

According to some embodiments of this application, the network emergency communication service associated with the sub-networks of a cell can be indicated. Based on this method, the terminal may decide whether to initiate an emergency communication service in PLMN, SNPN, a network corresponding to a temporary network identifier or a network corresponding to an access-control-related network identifier supported by the cell. In addition, from the perspective of the network, the flexibility of supporting the emergency communication service by the SNPN, PLMN, the network corresponding to the temporary network identifier, and the network corresponding to the access-control-related network identifier is improved through this method.

Figure 5:
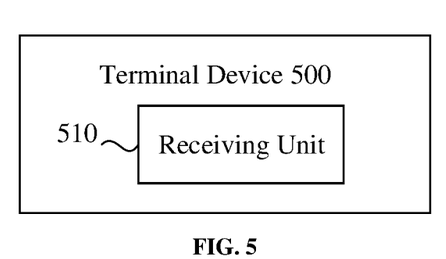
FIG. 5 is a schematic block diagram of a terminal device according to some embodiments of this application.

FIG. 5 is a schematic block diagram of a terminal device 500 according to some embodiments of this application. The terminal device 500 may include a receiving unit 510, configured to receive authorization configuration information, where the authorization configuration information includes emergency communication service authorization indication information associated with an identifier of at least one sub-network supported by a cell.

Optionally, in some embodiments of this application, the receiving unit is further configured to receive the authorization configuration information via an access stratum (AS) of the terminal device.

Figure 6:
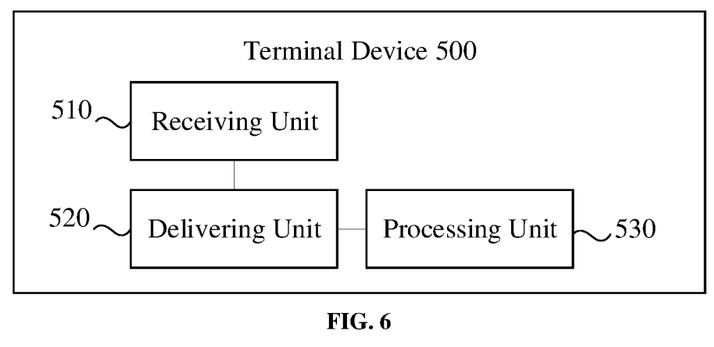
FIG. 6 is a schematic block diagram of a terminal device according to some other embodiments of this application.

As shown in FIG. 6, the terminal device further includes a delivering unit 520, configured to deliver the authorization configuration information received by the AS to the NAS of the terminal device.

Optionally, in some embodiments of this application, the terminal device 500 further include a processing unit 530 configured to determine, based on the authorization configuration information, emergency communication service support situation of at least one sub-network supported by an accessed cell.

Optionally, in some embodiments of this application, the identifier of at least one sub-network supported by the cell includes at least one of the following: a PLMN identifier supported by the cell; an SNPN identifier supported by the cell; a CAG identifier supported by the cell; a temporary network identifier; an access-control-related network identifier.

Optionally, in some embodiments of this application, a configuration granularity of the authorization configuration information includes at least one of the following: PLMN identifier granularity; SNPN identifier granularity; CAG identifier granularity; temporary network identifier granularity; access-control-related network identifier granularity.

Optionally, in some embodiments of this application, the authorization configuration information of the PLMN identifier granularity includes at least one of the following:
  each PLMN identifier supported by the cell is associated with one piece of emergency communication service authorization indication information.

Optionally, in some embodiments of this application, the authorization configuration information of the SNPN identifier granularity, the temporary network identifier granularity, or the access-control-related network identifier granularity includes at least one of the following:
  at least one of multiple SNPN identifiers, multiple temporary network identifiers, and multiple access-control-related network identifiers supported by the cell is associated with one piece of emergency communication service authorization indication information;
  each SNPN identifier, each temporary network identifier or each access-control-related network identifier supported by the cell is associated with one piece of emergency communication service authorization indication information.

Optionally, in some embodiments of this application, at least two of all PLMN identifiers, all SNPN identifiers, all temporary network identifiers, and all access-control-related network identifiers supported by the cell are associated with the same emergency communication service authorization indication information.

Optionally, in some embodiments of this application, the authorization configuration information of the CAG identifier granularity includes at least one of the following:
  each CAG identifier, corresponding to respective PLMN identifiers supported by the cell, is associated with one piece of emergency communication service authorization indication information;
  multiple CAG identifiers supported by the cell are associated with one piece of emergency communication service authorization indication information.

Optionally, in some embodiments of this application, the emergency communication service authorization indication information includes at least one of the following:
  authorization indication information on whether the terminal device is supported to initiate an emergency communication service;

terminal configuration requirement information for allowing the terminal device to initiate an emergency communication service;

authorization indication information on whether an emergency communication service is supported by one or more associated sub-network identifiers.

Optionally, in some embodiments of this application, the authorization configuration information is carried in a cell system broadcast message.

The terminal device 500 in some embodiments of this application may implement the corresponding functions of the terminal device in the foregoing method embodiments. For the corresponding processes, functions, implementations, and beneficial effects of each module (submodule, unit, or component, etc.) in the terminal device 500, reference may be made to the corresponding descriptions in the foregoing method embodiments, which will not be repeated here. It should be noted that the functions described with respect to each module (submodule, unit, or component, etc.) in the terminal device 500 according to some embodiments of this application may be implemented by different modules (submodules, units, or components, etc.), or may be implemented by the same module (submodule, unit or component, etc.).

Figure 7:
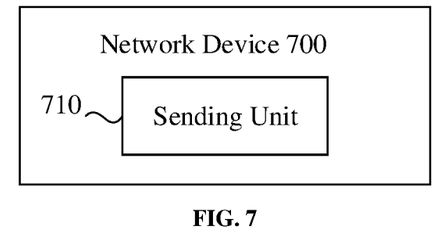
FIG. 7 is a schematic block diagram of a network device according to some embodiments of this application.

FIG. 7 is a schematic block diagram of a network device 700 according to some embodiments of this application. The network device 700 may include:

a sending unit 710, configured to send authorization configuration information, where the authorization configuration information includes emergency communication service authorization indication information associated with an identifier of at least one sub-network supported by the cell.

Optionally, in some embodiments of this application, the interface used by the network device 700 to transmit the authorization configuration information further includes at least one of the following: X2 interface; Xn interface; S1 interface; NG interface; F1 interface; E1 interface.

Optionally, in some embodiments of this application, the identifier of at least one sub-network supported by the cell includes at least one of the following: a PLMN identifier supported by the cell; an SNPN identifier supported by the cell; a CAG identifier supported by the cell; a temporary network identifier; an access-control-related network identifier.

Optionally, in some embodiments of this application, the configuration granularity of the authorization configuration information includes at least one of the following: PLMN identifier granularity; SNPN identifier granularity; CAG identifier granularity; temporary network identifier granularity; access-control-related network identifier granularity.

Optionally, in some embodiments of this application, the authorization configuration information of the PLMN identifier granularity includes at least one of the following:

each PLMN identifier supported by the cell is associated with one piece of emergency communication service authorization indication information.

Optionally, in some embodiments of this application, the authorization configuration information of the SNPN identifier granularity, the temporary network identifier granularity, or the access-control-related network identifier granularity includes at least one of the following:

at least one of multiple SNPN identifiers, multiple temporary network identifiers, and multiple access-control-related network identifiers supported by the cell is associated with one piece of emergency communication service authorization indication information;

each SNPN identifier, each temporary network identifier or each access-control-related network identifier supported by the cell is associated with one piece of emergency communication service authorization indication information.

Optionally, in some embodiments of this application, at least two of all PLMN identifiers, all SNPN identifiers, all temporary network identifiers, and all access-control-related network identifiers supported by the cell are associated with the same emergency communication service authorization indication information.

Optionally, in some embodiments of this application, the authorization configuration information of the CAG identifier granularity includes at least one of the following:

each CAG identifier, corresponding to respective PLMN identifiers supported by the cell, is associated with one piece of emergency communication service authorization indication information;

multiple CAG identifiers supported by the cell are associated with one piece of emergency communication service authorization indication information.

Optionally, in some embodiments of this application, the emergency communication service authorization indication information includes at least one of the following:

authorization indication information on whether the terminal device is supported to initiate an emergency communication service;

terminal configuration requirement information for allowing the terminal device to initiate an emergency communication service;

authorization indication information on whether an emergency communication service is supported by one or more associated sub-network identifiers.

Optionally, in some embodiments of this application, the authorization configuration information is carried in a cell system broadcast message.

The network device 700 in some embodiments of this application may implement the corresponding functions of the network device in the foregoing method embodiments. For the corresponding processes, functions, implementations, and beneficial effects of each module (submodule, unit, or component, etc.) in the network device 700, reference may be made to the corresponding descriptions in the foregoing method embodiments, which will not be repeated here. It should be noted that the functions described with respect to each module (submodule, unit, or component, etc.) in the terminal device 500 according to some embodiments of this application may be implemented by different modules (submodules, units, or components, etc.), or may be implemented by the same module (submodule, unit or component, etc.).

Figure 8:
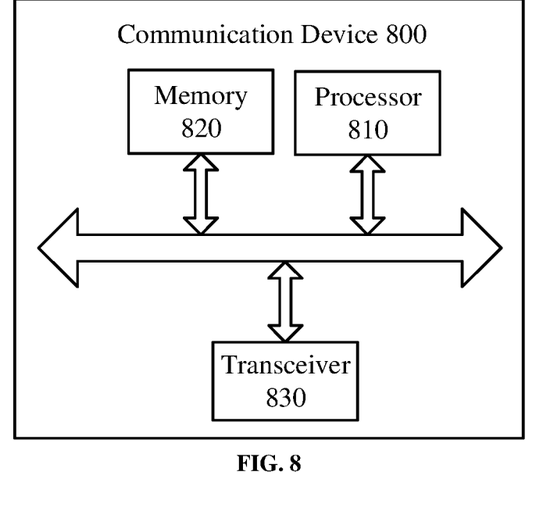
FIG. 8 is a schematic block diagram of a communication device according to some embodiments of this application.

FIG. 8 is a schematic block diagram of a communication device 800 according to some embodiments of this application. The communication device 800 includes a processor 810, and the processor 810 may call and run a computer program from a memory, so that the communication device 800 implements the methods according to some embodiments of this application. For example, the processor in the terminal device 500 may perform the functions of the processing unit 530 therein.

Optionally, the communication device 800 may also include a memory 820. The processor 810 may call and run the computer program from the memory 820, so that the communication device 800 implements the methods according to some embodiments of this application.

The memory 820 may be a separate device independent of the processor 810, or may be integrated in the processor 810.

Optionally, the communication device 800 may further include a transceiver 830, and the processor 810 may control the transceiver 830 to communicate with other devices, specifically, may send information or data to other devices, or receive information or data sent by other devices. For example, the transceiver in the terminal device 500 may perform the functions of the receiving unit 510 and the delivering unit 520 therein. For another example, the transceiver in the network device 700 may perform the function of the sending unit 710 in the network device 700.

In some embodiments, the transceiver 830 may include a transmitter and a receiver. The transceiver 830 may further include antennas, and the number of the antennas may be one or more.

Optionally, the communication device 800 may be the network device in some embodiments of this application, and the communication device 800 may implement corresponding processes implemented by the network device in respective methods according to some embodiments of this application, which is not repeated here for brevity.

Optionally, the communication device 800 may be the terminal device of some embodiments of this application, and the communication device 800 may implement the corresponding processes implemented by the terminal device in respective methods according to some embodiments of this application, which is not repeated here for brevity.

Figure 9:
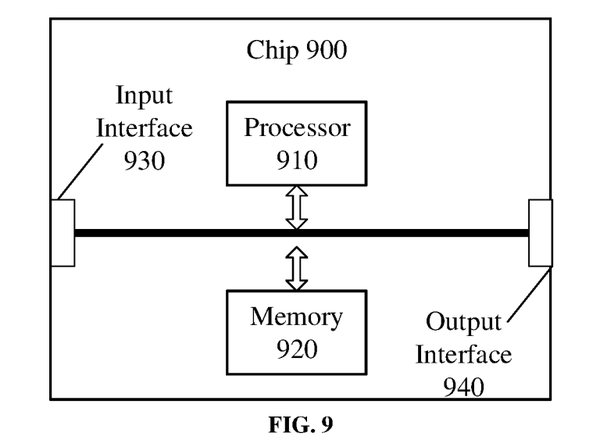
FIG. 9 is a schematic block diagram of a chip according to some embodiments of this application.

FIG. 9 is a schematic block diagram of a chip 900 according to some embodiments of this application. The chip 900 includes a processor 910, and the processor 910 may call and run a computer program from a memory, so as to implement the methods in some embodiments of this application.

Optionally, the chip 900 may further include a memory 920. The processor 910 may call and run the computer program from the memory 920 to implement the method executed by the terminal device or the network device in some embodiments of this application.

The memory 920 may be a separate device independent of the processor 910, or may be integrated in the processor 910.

Optionally, the chip 900 may further include an input interface 930. The processor 910 may control the input interface 930 to communicate with other devices or chips, and specifically, may acquire information or data sent by other devices or chips.

Optionally, the chip 900 may further include an output interface 940. The processor 910 may control the output interface 940 to communicate with other devices or chips, and specifically, may output information or data to other devices or chips.

Optionally, the chip may be applied to the network device in some embodiments of this application, and the chip may implement the corresponding processes implemented by the network device in respective methods according to some embodiments of this application, which is not repeated here for brevity.

Optionally, the chip may be applied to the terminal device in some embodiments of this application, and the chip may implement the corresponding processes implemented by the terminal device in respective methods according to some embodiments of this application, which is not repeated here for brevity.

Chips applied to network device and terminal device may be the same chip or different chips.

It should be understood that the chip mentioned in some embodiments of this application may also be referred to as a system-level chip, a system chip, a chip system, a system-on-a-chip, or the like.

The above-mentioned processor may be a general-purpose processor, a digital signal processor (DSP), a field programmable gate array (FPGA), an application specific integrated circuit (ASIC) or other programmable logic devices, transistor logic devices, discrete hardware components, or the like. The general-purpose processor mentioned above may be a microprocessor or any conventional processor or the like.

The memory mentioned above may be either volatile memory or non-volatile memory, or may include both volatile and non-volatile memory. The non-volatile memory may be read-only memory (ROM), programmable ROM (PROM), erasable PROM (EPROM), electrically EPROM (EEPROM) or flash memory. Volatile memory may be random access memory (RAM).

It should be understood that the above memory is an example but not a limitative description, for example, the memory in some embodiments of this application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct Rambus RAM (DR RAM) and the like. In other words, the memory in some embodiments of this application is intended to include but not limited to these and any other suitable types of memory.

Figure 10:
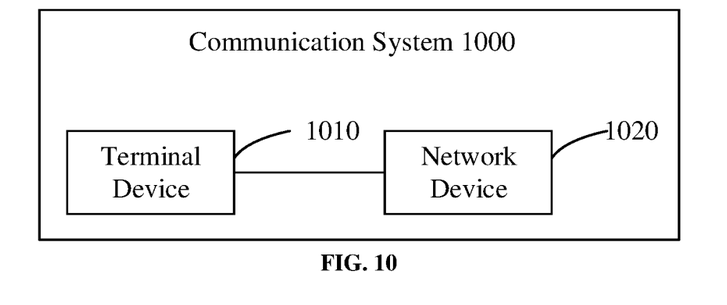
FIG. 10 is a schematic block diagram of a communication system according to some embodiments of this application.

FIG. 10 is a schematic block diagram of a communication system 1000 according to some embodiments of this application. The communication system 1000 includes a terminal device 1010 and a network device 1020. The terminal device 1010 is configured to receive authorization configuration information, where the authorization configuration information includes emergency communication service authorization indication information associated with an identifier of at least one sub-network supported by a cell. The network device 1020 is configured to send the authorization configuration information, where the authorization configuration information includes the emergency communication service authorization indication information associated with the identifier of at least one sub-network supported by the cell.

The terminal device 1010 may be configured to implement the corresponding functions implemented by the terminal device in the above method, and the network device 1020 may be configured to implement the corresponding functions implemented by the network device in the above method. For brevity, details are not repeated here.

In the above-mentioned embodiments, it may be implemented in whole or in part by software, hardware, firmware or any combination thereof. When implemented in software, it may be implemented in whole or in part in the form of a computer program product. The computer program product includes one or more computer instructions. When the computer program instructions are loaded and executed on a computer, the procedures or functions according to some embodiments of this application are generated in whole or in part. The computer may be a general purpose computer, a special purpose computer, a computer network, or other programmable device. The computer instructions may be stored on or transmitted from one computer readable storage medium to another computer readable storage medium, for example, the computer instructions may be transmitted, in a wired (e.g., coaxial cable, optical fiber, digital subscriber line (DSL)) or wireless (e.g., infrared, radio, microwave, etc) manner, from a website site, computer, server or data center over to another website site, computer, server or data center. The computer-readable storage medium may be any available medium that may be accessed by a computer or a data storage device such as a server, data center, and the like that includes one or more available medium integrated. The available medium may be a magnetic medium (e.g., a floppy disk, a hard disk, a magnetic tape), an optical medium (e.g., a DVD), or a semiconductor medium (e.g., a solid state disk (SSD)), and the like.

It should be understood that, in various embodiments of this application, the size of the sequence numbers of the above-mentioned processes does not mean the sequence of execution, and the execution sequence of each process should be determined by its functions and internal logic, and should not constitutes any limitation on some embodiments of this application.

Those skilled in the art may clearly understand that, for the convenience and brevity of description, the specific working process of the above-described systems, devices and units may refer to the corresponding processes in the foregoing method embodiments, which will not be repeated here.

The above are only specific embodiments of this application, but the protection scope of this application is not limited to this. Any person skilled in the art who is familiar with the technical scope disclosed in this application may easily think of changes or substitutions, which should fall within the protection scope of this application. Therefore, the protection scope of this application shall be subject to the protection scope of the claims.

What is claimed is:

1. An authorization configuration method, comprising:
    receiving, by a terminal device, authorization configuration information, wherein the authorization configuration information comprises emergency communication service authorization indication information associated with an identifier of at least one sub-network supported by a cell; and
    determining, by the terminal device based on the authorization configuration information, emergency communication service support situation of at least one sub-network supported by an accessed cell,
    wherein receiving, by the terminal device, the authorization configuration information comprises:
    delivering, by an access stratum (AS) of the terminal device, the received authorization configuration information to a non-access stratum (NAS) of the terminal device.

2. The method according to claim 1, wherein the identifier of the at least one sub-network supported by the cell comprises at least one of following:
    a public land mobile network (PLMN) identifier supported by the cell;
    a stand-alone non-public network (SNPN) identifier supported by the cell;
    a closed access group (CAG) identifier supported by the cell;
    a temporary network identifier; and
    an access-control-related network identifier.

3. The method according to claim 1, wherein a configuration granularity of the authorization configuration information comprises at least one of following:
    a PLMN identifier granularity;
    an SNPN identifier granularity;
    a CAG identifier granularity;
    a temporary network identifier granularity; and
    an access-control-related network identifier granularity.

4. The method according to claim 3, wherein the authorization configuration information of the SNPN identifier granularity, the temporary network identifier granularity or the access-control-related network identifier granularity comprises at least one of following:
    at least one of multiple SNPN identifiers, multiple temporary network identifiers, and multiple access-control-related network identifiers supported by the cell associated with one piece of emergency communication service authorization indication information;
    each SNPN identifier, each temporary network identifier or each access-control-related network identifier supported by the cell associated with one piece of emergency communication service authorization indication information.

5. The method according to claim 1, wherein the emergency communication service authorization indication information comprises at least one of following:
    authorization indication information on whether the terminal device is supported to initiate an emergency communication service;
    terminal configuration requirement information for allowing the terminal device to initiate an emergency communication service; and
    authorization indication information on whether an emergency communication service is supported by one or more associated sub-network identifiers.

6. The method according to claim 1, wherein the authorization configuration information is carried in a cell system broadcast message.

7. An authorization configuration method, comprising:
    sending, by a network device, authorization configuration information, wherein the authorization configuration information comprises emergency communication service authorization indication information associated with an identifier of at least one sub-network supported by a cell and is used for determining, by a terminal device based on the authorization configuration information, emergency communication service support situation of at least one sub-network supported by an accessed cell,
    wherein the authorization configuration information is to be delivered by an access stratum (AS) of the terminal device to a non-access stratum (NAS) of the terminal device.

8. The method according to claim 7, wherein an interface used by the network device to transmit the authorization configuration information comprises at least one of following:
    X2 interface; Xn interface; S1 interface; NG interface; F1 interface; and E1 interface.

9. The method according to claim 7, wherein the identifier of the at least one sub-network supported by the cell comprises at least one of following:
    a public land mobile network (PLMN) identifier supported by the cell;
    a stand-alone non-public network (SNPN) identifier supported by the cell;
    a closed access group (CAG) identifier supported by the cell;
    a temporary network identifier; and
    an access-control-related network identifier.

10. The method according to claim 7, wherein a configuration granularity of the authorization configuration information comprises at least one of following:
    a PLMN identifier granularity;
    an SNPN identifier granularity;

a CAG identifier granularity;
a temporary network identifier granularity; and
an access-control-related network identifier granularity.

11. The method according to claim 10, wherein the authorization configuration information of the SNPN identifier granularity, the temporary network identifier granularity or the access-control-related network identifier granularity comprises at least one of following:
   at least one of multiple SNPN identifiers, multiple temporary network identifiers, and multiple access-control-related network identifiers supported by the cell associated with one piece of emergency communication service authorization indication information;
   each SNPN identifier, each temporary network identifier or each access-control-related network identifier supported by the cell associated with one piece of emergency communication service authorization indication information.

12. The method according to claim 7, wherein the emergency communication service authorization indication information comprises at least one of following:
   authorization indication information on whether a terminal device is supported to initiate an emergency communication service;
   terminal configuration requirement information for allowing the terminal device to initiate an emergency communication service; and
   authorization indication information on whether an emergency communication service is supported by one or more associated sub-network identifiers.

13. The method according to claim 7, wherein the authorization configuration information is carried in a cell system broadcast message.

14. A terminal device, comprising a processor and a memory, wherein the memory is configured to store a computer program, and the processor is configured to call and run the computer program stored in the memory, thereby causing the terminal device to:
   receive authorization configuration information, wherein the authorization configuration information comprises emergency communication service authorization indication information associated with an identifier of at least one sub-network supported by a cell; and
   determine, based on the authorization configuration information, emergency communication service support situation of at least one sub-network supported by an accessed cell,
   wherein the processor is further configured call and run the computer program stored in the memory, thereby further causing the terminal device to receive the authorization configuration information via an access stratum (AS) of the terminal device, and deliver the authorization configuration information received by the AS to a non-access stratum (NAS) of the terminal device.

15. The terminal device according to claim 14, wherein the identifier of the at least one sub-network supported by the cell comprises at least one of following:
   a public land mobile network (PLMN) identifier supported by the cell;
   a stand-alone non-public network (SNPN) identifier supported by the cell;
   a closed access group (CAG) identifier supported by the cell;
   a temporary network identifier; and
   an access-control-related network identifier.

16. The terminal device according to claim 14, wherein a configuration granularity of the authorization configuration information comprises at least one of following:
   a PLMN identifier granularity;
   an SNPN identifier granularity;
   a CAG identifier granularity;
   a temporary network identifier granularity; and
   an access-control-related network identifier granularity.

* * * * *